US009990201B2

(12) United States Patent
Gopal et al.

(10) Patent No.: US 9,990,201 B2
(45) Date of Patent: Jun. 5, 2018

(54) MULTIPLICATION INSTRUCTION FOR WHICH EXECUTION COMPLETES WITHOUT WRITING A CARRY FLAG

(75) Inventors: Vinodh Gopal, Westborough, MA (US); James D. Guilford, Northborough, MA (US); Wajdi K. Feghali, Boston, MA (US); Erdine Ozturk, Marlborough, MA (US); Gilbert M. Wolrich, Framingham, MA (US); Martin G. Dixon, Portland, OR (US); Mark C. Davis, Portland, OR (US); Sean P. Mirkes, Beaverton, OR (US); Alexandre Farcy, Hillsboro, OR (US); Bret L. Toll, Hillsboro, OR (US); Maxim Loktyukhin, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 953 days.

(21) Appl. No.: 12/645,383

(22) Filed: Dec. 22, 2009

(65) Prior Publication Data

US 2011/0153994 A1    Jun. 23, 2011

(51) Int. Cl.
*G06F 15/00*   (2006.01)
*G06F 7/38*    (2006.01)
*G06F 9/00*    (2006.01)
*G06F 9/44*    (2018.01)
*G06F 9/30*    (2018.01)

(52) U.S. Cl.
CPC ...... *G06F 9/30094* (2013.01); *G06F 9/30014* (2013.01)

(58) Field of Classification Search
None
See application file for complete search history.

(56) References Cited

U.S. PATENT DOCUMENTS

| | | | |
|---|---|---|---|
| 5,126,964 A * | 6/1992 | Zurawski | G06F 7/5272 708/518 |
| 5,881,259 A * | 3/1999 | Glass et al. | 712/210 |
| 7,234,044 B1 * | 6/2007 | Perry | G06F 9/30094 712/219 |
| 7,373,514 B2 | 5/2008 | Krueger et al. | |
| 7,512,945 B2 | 3/2009 | Sydir et al. | |
| 7,539,718 B2 | 5/2009 | Koshy et al. | |
| 7,607,068 B2 | 10/2009 | Gopal et al. | |

(Continued)

OTHER PUBLICATIONS

"MC88110 Second Generation RISC Microprocessor User's Manual". 1991. pp. 2-9 through 2-10, 5-12, and 10-94.*

(Continued)

*Primary Examiner* — George Giroux
(74) *Attorney, Agent, or Firm* — Nicholson De Vos Webster & Elliott LLP

(57) ABSTRACT

A method in one aspect may include receiving a multiply instruction. The multiply instruction may indicate a first source operand and a second source operand. A product of the first and second source operands may be stored in one or more destination operands indicated by the multiply instruction. Execution of the multiply instruction may complete without writing a carry flag. Other methods are also disclosed, as are apparatus, systems, and instructions on machine-readable medium.

32 Claims, 9 Drawing Sheets

(56) References Cited

U.S. PATENT DOCUMENTS

| | | | |
|---|---|---|---|
| 2005/0073606 A1* | 4/2005 | Haydock | G06F 9/30072 348/425.3 |
| 2005/0102411 A1* | 5/2005 | Haydock | H04N 21/434 709/231 |
| 2005/0123140 A1 | 6/2005 | Feghali | |
| 2005/0135604 A1 | 6/2005 | Feghali et al. | |
| 2005/0289264 A1* | 12/2005 | Illowsky | G06F 1/3203 710/104 |
| 2006/0059219 A1 | 3/2006 | Koshy et al. | |
| 2006/0242386 A1* | 10/2006 | Wood | G06F 9/30145 712/220 |
| 2006/0282744 A1* | 12/2006 | Kounavis | H03M 13/6502 714/758 |
| 2007/0157030 A1 | 7/2007 | Feghali et al. | |
| 2007/0299899 A1 | 12/2007 | Hasenplaugh | |
| 2007/0300049 A1 | 12/2007 | Sodani | |
| 2008/0013715 A1 | 1/2008 | Feghali et al. | |
| 2008/0140753 A1 | 6/2008 | Gopal | |
| 2008/0144810 A1 | 6/2008 | Gopal et al. | |
| 2008/0144811 A1 | 6/2008 | Gopal et al. | |
| 2008/0148011 A1 | 6/2008 | Gopal et al. | |
| 2008/0159526 A1 | 7/2008 | Gueron | |
| 2008/0229116 A1 | 9/2008 | Dixon et al. | |
| 2008/0069337 A1 | 10/2008 | Gopal et al. | |
| 2008/0240422 A1 | 10/2008 | Ozturk et al. | |
| 2008/0240423 A1* | 10/2008 | Gueron | G06F 7/724 380/28 |
| 2008/0240426 A1 | 10/2008 | Gueron et al. | |
| 2008/0240421 A1 | 12/2008 | Gopal | |
| 2008/0304659 A1 | 12/2008 | Ozturk et al. | |
| 2009/0003593 A1 | 1/2009 | Gopal et al. | |
| 2009/0003594 A1 | 1/2009 | Ozturk et al. | |
| 2009/0003595 A1 | 1/2009 | Ozturk et al. | |
| 2009/0003596 A1 | 1/2009 | Ozturk et al. | |
| 2009/0006511 A1 | 1/2009 | Ozturk et al. | |
| 2009/0006512 A1 | 1/2009 | Ozturk et al. | |
| 2009/0006517 A1 | 1/2009 | Dixon et al. | |

OTHER PUBLICATIONS

"MC88110 Second Generation RISC Microprocessor User's Manual". 1991. pp. 1-626.*

"Nitrox II", *Cavium Networks*, http://www.caviumnetworks.com/processor_security_nitroxII.htm (Nov. 11, 2009), (2000-2009), 1 pg.

"Software Optimization Guide for AMD Family 10h Processors", *Advanced Micro Devices*, Publication 40546 Revision 3.09, (Nov. 2008), pp. 1-316.

"Software Optimization Resources", http://www.agner.org/optimize (Jan. 5, 2010), (2009), 1-5.

"The SPARC Architecture Manual, Version 8", *SPARC International, Inc.*, (1991,1992), pp. 1-303.

"UltraSPARC Cryptographic Performance", *UltraSPARC cryptographic accelerators-Wikipedia*, http://wikis.sun.com/display/CryptoPerf/UltraSPARC+cryptographic+performance (Nov. 11, 2009), (Jul. 8, 2008), pp. 1-5.

"VIA Nano Processor", *VIA Technologies Inc.*, (2008), pp. 1-15.

Fog, Agner "Optimization Manual 4 Instruction Tables", *Copenhagen University College of Engineering*, Software Optimization Resources, http://www.agner.org/optimize (Jan. 5, 2010), (1996-2009), pp. 1-154.

Henry, G. G., "The VIA Isaiah Architecture", *Centaur Technology, Inc.*, (Jan. 2008), pp. 1-12.

U.S. Appl. No. 11/323,994, filed Dec. 30, 2005, Feghali et al.

U.S. Appl. No. 12/368,196, filed Feb. 9, 2009, Gopal et al.

U.S. Appl. No. 12/313,841, filed Nov. 25, 2008, Gopal.

"Intel Architecture Software Developer's Manual vol. 2: Instruction Set Reference," Intel, 1999, pp. 1-2 and 3-448-3-449.

"The SPARC" Architecture Manual, Version 8, Sparc International, 1991-1992, pp. 1-2 and 112-114.

* cited by examiner

| INSTRUCTION | DESCRIPTION |
|---|---|
| MULX — UNSIGNED MULTIPLY WITHOUT AFFECTING FLAGS INSTRUCTION | PERFORMS UNSIGNED MULTIPLICATION OF FIRST SOURCE OPERAND AND SECOND SOURCE OPERAND AND STORES RESULT IN DESTINATION OPERAND WITHOUT READING OR WRITING ARITHMETIC FLAGS. THIS POSSIBLY ENABLES EFFICIENT PROGRAMMING WHERE SOFTWARE CAN INTERLEAVE ADD WITH CARRY OPERATIONS AND MULTIPLICATIONS. RDX/EDX REGISTER IS USED AS IMPLICIT SOURCE. RAX/EAX REGISTER IS IMPLICIT DESTINATION OF LOW 64/32 BITS OF RESULT. HIGH 64/32 BITS OF RESULT ARE WRITTEN TO EXPLICITLY ENCODED DESTINATION REGISTER OPERAND. |

*FIG. 9*

```
IF (OPERANDSIZE = 32)
    EAX ← (EDX*SRC)[31:0];
    DEST ← (EDX*SRC)[63:32];
ELSE IF (OPERANDSIZE = 64)
    RAX ← (RDX*SRC)[63:0];
    DEST ← (RDX*SRC)[127:64];
FI
```

*FIG. 10*

MULTIPLICATION INSTRUCTION FOR WHICH EXECUTION COMPLETES WITHOUT WRITING A CARRY FLAG

BACKGROUND

Field

Various different embodiments relate to instructions, methods of executing the instructions, execution units to execute the instructions, or devices incorporating such execution units. In particular, various different embodiments relate to multiply instructions for which execution completes without writing a carry flag, methods of executing the instructions, execution units to execute the instructions, or devices incorporating such execution units.

Background Information

Multiply instructions are commonly included in instruction set architectures (ISAs). The multiply instructions allow devices to multiply data.

One known multiply instruction is the MUL—Unsigned Multiply instruction. The MUL instruction is described in the Intel® 64 and IA-32 Architectures Software Developer's Manual Volume 2A: Instruction Set Reference, A-M, Order Number: 253666-032US, September 2009, as well as in various older manuals.

In addition to causing multiplication, the MUL instruction also modifies the carry flag (CF) and the overflow flag (OF). If the high-order bits of the product/result are 0, the carry and overflow flags are cleared, otherwise, the carry and overflow flags are set. In certain instances, there are significant drawbacks to such modification of the overflow and/or carry flags. As one example, this may tend to reduce the speed and/or efficiency of large number multiplication and certain other data processing.

Due to the importance of quickly and efficiently processing data, new and different multiply instructions would be useful.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 7 illustrates one particular example embodiment of a suitable 32-bit general-purpose register set.

FIG. 8 illustrates one particular example embodiment of a suitable 64-bit general-purpose register set.

FIG. 9 shows a description of a MULX instruction representing a particular example embodiment of a multiply instruction.

FIG. 10 shows operation in pseudocode of a MULX instruction representing a particular example embodiment of a multiply instruction.

DETAILED DESCRIPTION

In the following description, numerous specific details, such as instruction implementation specifics, data types, register types, register arrangements, processor types, system configurations, and the like, are set forth. However, it is understood that embodiments of the invention may be practiced without these specific details. In other instances, well-known circuits, structures and techniques have not been shown in detail in order not to obscure the understanding of this description.

Embodiments pertain to an instruction processing apparatus having an execution unit to execute a multiply instruction and complete execution of the multiply instruction without writing a carry flag.

Figure 1:
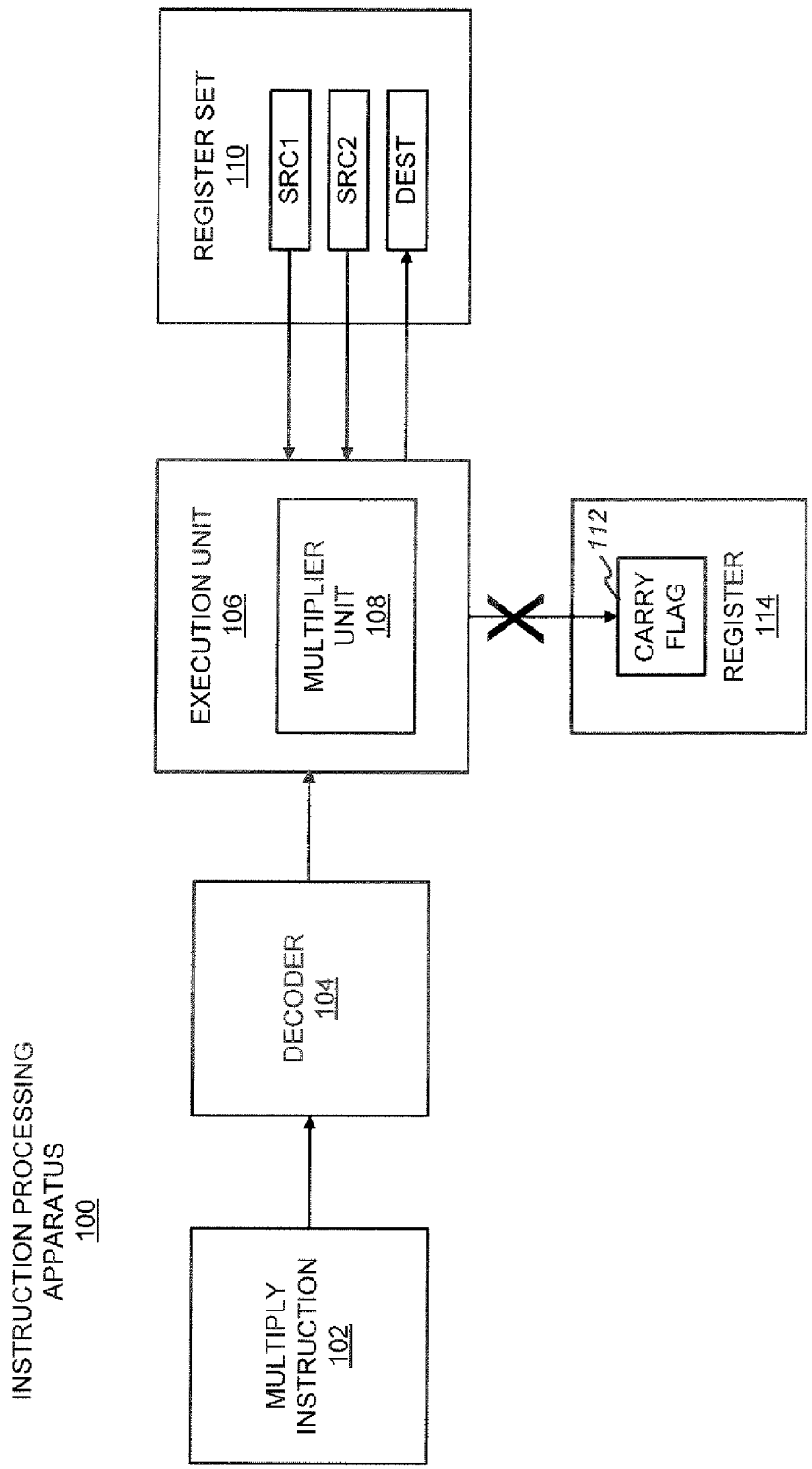
FIG. 1 is a block diagram of an example embodiment of an instruction processing apparatus.

FIG. 1 is a block diagram of an example embodiment of an instruction processing apparatus 100. In one or more embodiments, the instruction processing apparatus may be a general-purpose processor. The processor may be any of various complex instruction set computing (CISC) processors, various reduced instruction set computing (RISC) processors, various very long instruction word (VLIW) processors, various hybrids thereof, or other types of processors entirely. In one or more embodiments, the processor may be a general-purpose processor of the type manufactured by Intel Corporation, of Santa Clara, Calif., although this is not required. Specific examples of general-purpose processors available from Intel Corporation include, but are not limited to, Intel® Core™ i7 processor Extreme Edition, Intel® Core™ i7 processor, Intel® Core™ i5 processor, Intel® Core™2 Extreme processor, Intel® Core™2 Quad processor, Intel® Core™2 Duo processor, Intel® Pentium® processor, and Intel® Celeron® processor.

Alternatively, the instruction processing apparatus may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. These processors can also be based on CISC, RISC, VLIW, hybrids thereof, or other types of processors entirely.

In still other embodiments, the instruction processing apparatus may be a controller (e.g., a microcontroller), or other type of logic circuit capable of processing instructions.

Referring again to FIG. 1, during use the instruction processing apparatus may receive an embodiment of a multiply instruction 102. By way of example, the multiply instruction may be received from a memory or from software. The multiply instruction may represent a machine instruction or control signal that is recognized by the instruction processing apparatus. The instruction processing apparatus may have specific or particular circuitry or other logic (e.g., software combined with hardware and/or firmware) that is operable to perform a multiplication operation on data in response to and/or as specified by the multiply instruction and store a product or result in response to or as a result of the machine instruction.

The illustrated embodiment of the instruction processing apparatus includes an instruction decoder 104. The decoder may receive and decode the multiply instruction. The decoder may generate and output one or more micro-operations, micro-code entry points, microinstructions, other instructions, or other control signals, which reflect, or are derived from, the original multiply instruction. The decoder may be implemented using various different mechanisms. Examples of suitable mechanisms include, but are not limited to, microcode random access memories (ROMs), look-up tables, hardware implementations, programmable logic arrays (PLAs), and the like.

The decoder is not a required component of the apparatus. In one or more other embodiments, the apparatus may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the multiply instruction, emulate, translate, morph, interpret, or otherwise convert the multiply instruction, and output one or more instructions or control signals corresponding to the original multiply instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic.

Referring again to FIG. 1, the instruction processing apparatus includes an execution unit 106. By way of example, the execution unit may include an arithmetic unit, an arithmetic logic unit, or the like. The execution unit includes a multiplier unit 108.

In the illustrated embodiment, the execution unit is coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact with each other (e.g., through an intervening component). As one example, the decoder and the execution unit may be coupled with one another through an intervening optional buffer or other component(s) known in the arts to possibly be coupled between a decoder and an execution unit. As a result of the decoder decoding the multiply instruction, the execution unit may receive one or more micro-operations, micro-code entry points, microinstructions, other instructions, or other control signals, which reflect, or are derived from, the multiply instruction. Alternatively, the execution unit may receive and execute instructions or control signals from the aforementioned instruction conversion logic.

In one or more embodiments, the execution unit may be operable as a result of the multiply instruction 102 indicating a first source operand (SRC1) and a second source operand (SRC2) to store a product of the first and second source operands in one or more destination operands (DEST) indicated by the multiply instruction. The multiply instruction may implicitly specify and/or explicitly specify (e.g., through one or more dedicated fields or sets of bits) the source and destination operands. Examples of suitable sources of the operands include registers, memory, immediates of the instruction, and combinations thereof. As a result of the multiply instruction, the decoder, or another portion of the apparatus, may access the first source operand (SRC1) and the second source operand (SRC2). The execution unit may include circuitry or other execution logic (e.g., software combined with hardware and/or firmware) operable to execute the instructions or other control signals derived from the multiply instruction and multiply the first and second source operands. The execution unit may store the product in the one or more destination operands (DEST).

In one or more embodiments, some or all of the source and destination operands may be stored in registers of a register set 110. The register set may be part of a register file, along with potentially other registers, such as status registers. The register may be a storage location or device that may be used to store data. The register set may often be physically located on die with the execution unit. The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

As shown, the processor or other instruction execution apparatus may include a carry flag 112. As shown, in one or more embodiments, the carry flag may be included in a register 114, such as, for example, a status register, a flag register, or a condition code register.

Processors and various other types of logic devices often utilize flags. The flags may include one or more bits, often of a register, such as, for example, a status register, a flags register, or a condition code register (CCR). The bits don't have to be in a register. The flag may include a flip-flop circuit. A bit flag may store a binary value, such as a binary one or a binary zero. A plurality of bits may store a sequence of binary values or a code. Such binary values, or sequences of binary values, may represent different values of the flag. These different values of the flag may have an assigned or understood meaning to the processor or other logic device. The flags may be used for various different purposes. In some cases, the flags may be used to record a status, state, condition, or outcome of operations within the processor or other logic device.

A carry flag is a well-known type of flag that is commonly found in processors and other logic devices. The carry flag may represent an architectural flag or status flag that may be used to indicate whether or not there is overflow in arithmetic operations. For example, the carry flag may have a first value if there is overflow during a prior calculation, or the carry flag may have a second value if there is no such overflow. The carry flag may be used to indicate that an arithmetic operation has generated a result that is greater in magnitude than the number of bits in a given register or storage location can represent. For example, in one or more embodiments, the carry flag may be a single bit that may be set to 1 if an arithmetic operation generates a carry or borrow out of the most-significant bit of the result, and the carry flag may otherwise be set to 0. The carry flag is often utilized in arithmetic operations, such as addition and subtraction.

In one or more embodiments, the execution unit may be operable to complete execution of the multiply instruction without writing the carry flag 230. In one or more embodiments, the execution unit may be to complete execution of the multiply instruction without writing the carry flag regardless of a value of the product. In one or more embodiments, the execution unit may be to complete execution of the multiply instruction without reading the carry flag. As will be explained further below, this feature of the multiply instruction may offer certain advantages, such as, for example, helping to improve the speed and/or efficiency of large number multiplication involving an integer larger than the data word size of a processor, and certain other algorithms.

To avoid obscuring the description, a relatively simple instruction processing apparatus has been shown and described. It is to be appreciated that other embodiments may have a plurality of execution units. For example, the apparatus may include multiple different types of execution units, such as, for example, arithmetic units, arithmetic logic units (ALUs), integer units, etc. At least one of these units may be responsive to an embodiment of multiply instruction as disclosed herein. Still other embodiments may have multiple cores, logical processors, or execution engines. An execution unit operable to execute a multiply instruction as disclosed herein may be included within at least one, at least two, most, or all of the cores, logical processors, or execution engines.

The instruction processing apparatus may also optionally include one or more other well-known components. For example, other embodiments may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope of the invention is not limited to any known such combination or configuration. Embodiments may be implemented either with or without such additional components.

Figure 2:
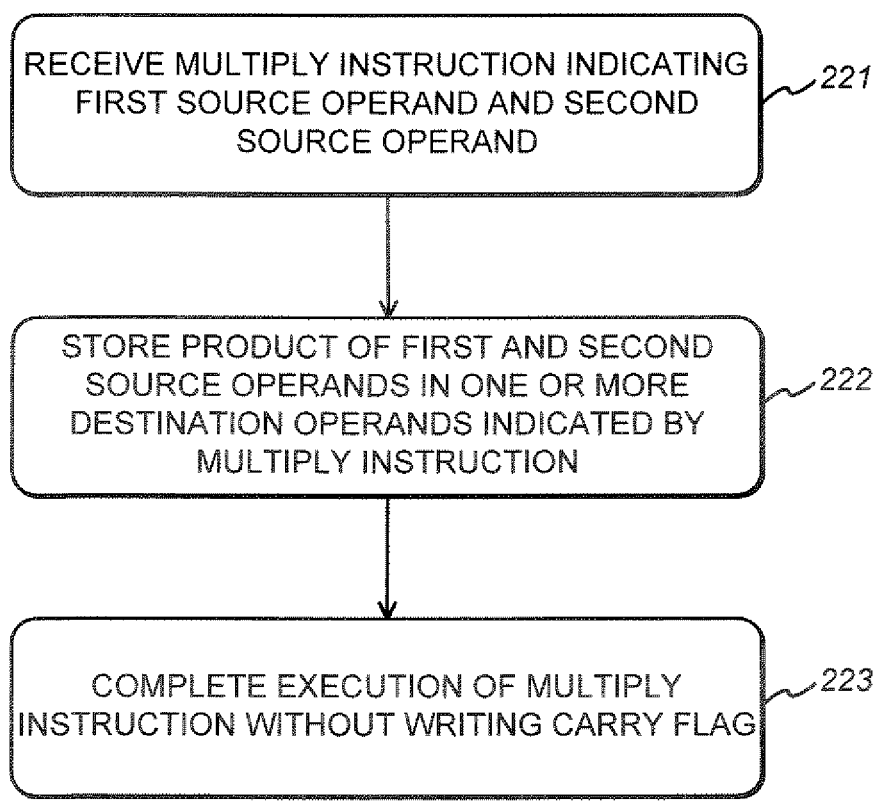
FIG. 2 is a block flow diagram of an embodiment of a method of processing an embodiment of a multiply instruction.

FIG. 2 is a block flow diagram of an embodiment of a method 220 of processing an embodiment of a multiply instruction. In various embodiments, the method may be performed by a general-purpose processor, a special-purpose processor (e.g., a graphics processor or a digital signal processor), a hardware accelerator (e.g., a cryptographic accelerator), or another type of logic device or instruction processing apparatus.

The multiply instruction may be received at the processor or other instruction processing apparatus, at block 221. In one or more embodiments, the multiply instruction may indicate a first source operand and a second source operand.

A product of the first and second source operands may be stored in one or more destination operands indicated by the multiply instruction as a result of the multiply instruction, at block 222.

In accordance with one or more embodiments, execution of the multiply instruction may be completed without writing a carry flag, at block 223. In one or more embodiments, execution of the multiply instruction may be completed without writing the carry flag regardless of a value of the product.

In one or more embodiments, the multiply instruction may multiply integers. In one or more embodiments, the integers may be unsigned integers. Alternatively, in one or more embodiments, the integers may be signed integers. To illustrate certain concepts, the present disclosure will tend to emphasize multiplication of unsigned integers, although the scope of the invention is not so limited.

Figure 3:
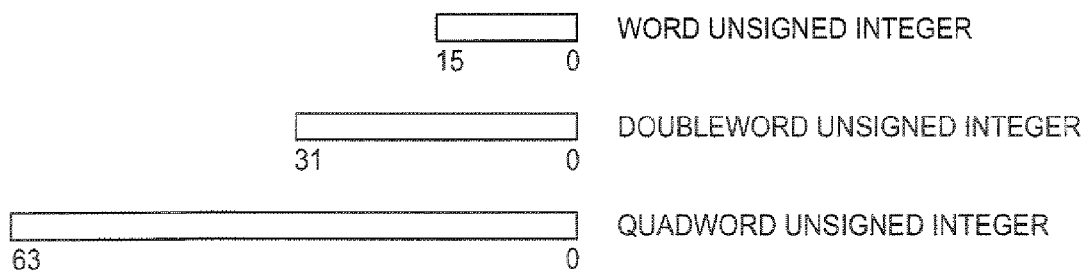
FIG. 3 illustrates various unsigned integer numeric data types that are suitable for one or more embodiments.

FIG. 3 illustrates various unsigned integer numeric data types that are suitable for one or more embodiments. A first type is a "word unsigned integer". The word unsigned integer has 16-bits. A second type is a doubleword unsigned integer. The doubleword unsigned integer has 32-bits. A third type is a quadword unsigned integer. The quadword unsigned integer has 64-bits. These are just a few illustrative examples. Other sizes of unsigned integers, such as byte or wider than 64-bit types (e.g., 128-bit types), are also suitable. Moreover, analogous signed integer types are also suitable.

Large integer multiplication, for example involving one or more integers larger than the size of the registers used to store the integers, such as for example larger than 64-bits when 64-bit or smaller registers are used to store the integers, is used in various different types of algorithms. For example, large integer multiplication is prevalent in modular exponentiation, cryptography, public key encryption, Transport Layer Security (TLS), Secure Sockets Layer (SSL), Internet Protocol Security (IPsec), Internet Protocol version 6 (IPv6)), as well as other non-cryptographic algorithms that utilize large number multiplication. With regard to cryptography, over the past several years, there has been a significant increase in the use of cryptographic algorithms, for example, due to increasingly more Internet and other network transactions being cryptographically secured. As a result, dedicated cryptographic accelerators, embedded cryptographic processors, servers supporting many connections, and the like, may perform such cryptographic algorithms very frequently. Accordingly, the performance of these devices may be significantly affected by the speed and/or efficiency of performing large number multiplications. Desktop and laptop computers, and other devices, although perhaps less frequently, are also asked to perform such cryptographic algorithms. Additionally, there are other non-cryptographic uses of large number multiplication used in various different types of computer algorithms, which are performed by processors and other logic devices found in servers, embedded processors, accelerators, desktop computers, laptop computers, and the like. Accordingly, new and different multiply instructions that help to increase the speed and/or efficiency of multiplication would be useful.

In one or more embodiments, the multiplication instruction may be used to multiply one or more large integers that are too large to fit in a given single register. By way of example, multiplication may be performed on a 256-bit or 512-bit integer, for example, and the register set used to store the integer may be only 128-bits, 64-bits, or 32-bits, for example. Accordingly, the whole 256-bit or 512-bit integer will not fit in a single register. In such a case, different portions of the 256-bit or 512-bit integer may be stored in different registers. In one aspect, the integers are larger than 64-bits.

Figure 4:
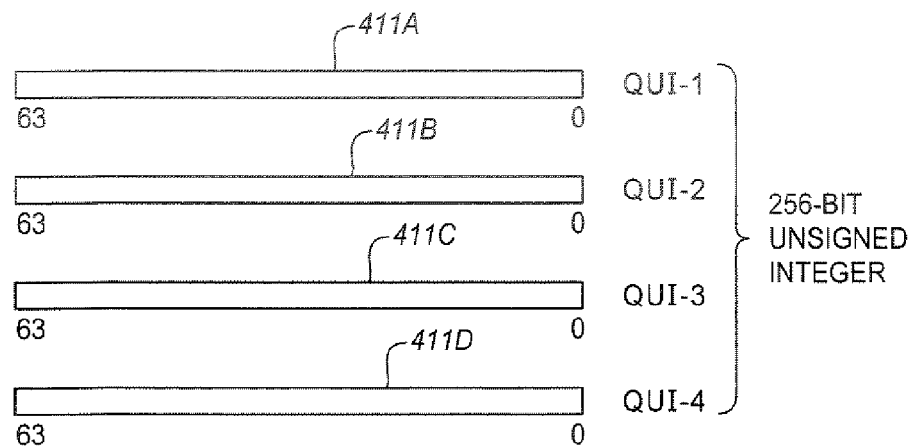
FIG. 4 illustrates one particular example embodiment of a 256-bit unsigned integer stored as four different quadword unsigned integers in four different registers.

To further illustrate, FIG. 4 illustrates one particular example embodiment of a 256-bit unsigned integer stored as four quadword unsigned integers (QUI) each stored in one of four respective registers. In particular, a first quadword unsigned integer (QUI-1) is stored in a first register 411A, a second quadword unsigned integer (QUI-2) is stored in a second register 411B, a third quadword unsigned integer (QUI-3) is stored in a third register 411C, and a fourth quadword unsigned integer (QUI-4) is stored in a fourth register 411D. The four quadword unsigned integers (QUI-1 through QUI-4) collectively represent the 256-bit unsigned integer. The 256-bit unsigned integer stored in such a way may be referred to as a multi-word vector of unsigned integers.

Performing multiplication on a large integer, which is too large to fit in a single register, may pose certain challenges. For example, more than one multiply instruction may be used. Each multiply instruction may cause multiplication to be performed on only a portion of the large integer to form a partial product. The term partial product is meant to refer to a fully calculated product of only part of at least one number. Each of these partial products may then be added or otherwise combined to obtain the product of the original large integer. Adding the partial products may involve addition with carry propagation utilizing a carry flag as an input and generating a result that is dependent upon the value of the carry flag.

To further illustrate how the carry flag may be used in addition, consider an example in which the numbers 255 and 255 are added together using 8-bit unsigned integers. The value of 255 plus 255 is 510. The number 510 is represented in binary as "1 1111 1110." However, note that "1 1111 1110" has 9-bits instead of just 8-bits. In other words, representing the number 510 in binary requires 9-bits, instead of just 8-bits. The eight least significant bits "1111 1110" is the binary representation for the number 254. Since the sum of 255 plus 255 generates a "carry" out of most significant eighth bit into the ninth bit, the carry flag may be set to a value of 1. Setting the carry flag to a value of 1 may indicate to the machine that the result is incorrect in an 8-bit unsigned interpretation and/or may indicate that the correct result is the 9-bit concatenation of the 1-bit carry flag with the 8-bit result. The carry flag may be used (e.g., as a carry-in) for a subsequent arithmetic operation, such as addition or and subtraction.

One known add instruction is the ADC—Add with Carry instruction. The ADC instruction is described in the Intel® 64 and IA-32 Architectures Software Developer's Manual Volume 2A: Instruction Set Reference, A-M, Order Number: 253666-032US, September 2009, as well as in older manuals. In brief, the ADC instruction adds the destination operand (first operand), the source operand (second operand), and the carry (CF) flag and stores the result in the destination operand. The state of the carry flag (CF) represents a carry from a previous addition. The ADC instruction does not distinguish between signed or unsigned operands. Instead, the processor evaluates the result for both data types and sets the overflow flag (OF) and carry flag (CF) to indicate a carry in the signed or unsigned result, respectively. The SF flag indicates the sign of the signed result. The ADC instruction is commonly executed as part of a multibyte or multiword addition in which an ADD instruction, also described in the aforementioned IA manual, is followed by an ADC instruction.

Other suitable add instructions include the add3 and/or adoc3 instructions disclosed in U.S. patent application Ser. No. 12/645,334, filed on Dec. 22, 2009, titled "ADD INSTRUCTIONS TO ADD THREE SOURCE OPERANDS," which is assigned to the assignee of the present patent application.

However, as discussed above, the MUL instruction clears or sets the carry flag (CF) and overflow flag (OF) depending upon the high-order bits of the product. In large integer multiplication, for example, since the MUL instruction may change the carry flag, the MUL instruction should not be placed within a series of ADD/ADC instructions. The partial product results of the MUL instructions would need to be stored, and then the ADD/ADC's instructions subsequently performed on the partial product results. Depending upon the number of registers available, storing all of these partial product results of the MUL instructions before they are added may tend to consume all of the available registers, resulting in memory fill/spills and/or accesses to system memory. These aspects may reduce the efficiency and/or speed of certain algorithms, such as, for example, large integer multiplication.

A multiply instruction, in accordance with one or more embodiments, may not write or otherwise alter the value of the carry flag. This may allow the multiply instruction the opportunity to reside within a series of add instructions (e.g., a chain of ADD and/or ADC instructions) in code. This may help to increase the speed and/or efficiency of large number multiplication, high-performance computing, and more generally in other algorithms where multiplication is performed and the carry flag is used as part of the multiplication.

To further illustrate, consider the following example method of multi-word multiplication. A first multiply instruction may indicate a first source operand and a second source operand. Each of the first and second source operands may represent portions of respective first and second larger integer which are too large to be stored in individual registers used to store the first and second source operands. A first product of the first and second source operands may be stored in one or more destination operands indicated by the first multiply instruction. Execution of the first multiply instruction may complete without writing a carry flag. The method may continue with a second multiply instruction indicating a third source operand and a fourth source operand. Each of the third and fourth source operands may represent other portions of the respective first and second large integers. A second product of the third and fourth source operands may be stored in one or more destination operands indicated by the second multiply instruction. Execution of the second multiply instruction may complete without writing the carry flag. The method may continue with an add instruction. The add instruction may cause the first product and the second product to be added together utilizing the carry flag. Since execution of the multiply instruction of an embodiment completes without writing the carry flag, efficiency of an algorithm involving adding the products may be increased.

Referring again to the known MUL instruction, a destination operand for the MUL instruction is an implicit or implied register, and this implied register is also used for the first operand. As a result, unless the first source operand is moved (e.g., with a MOV or other move instruction), or otherwise preserved, execution of the MUL instruction will cause the first source operand to be overwritten with the result or product of the MUL instruction. Moreover, in order to preserve the result of the prior MUL instruction, the result of the prior MUL instruction would need to be moved to another location (e.g., with a MOV or other move instruction) prior to execution of the next MUL instruction. These additional move (e.g., MOV) instructions tend to increase the number of instructions that need to be decoded, as well as the number of operations that need to be potentially buffered and executed.

Figure 5:
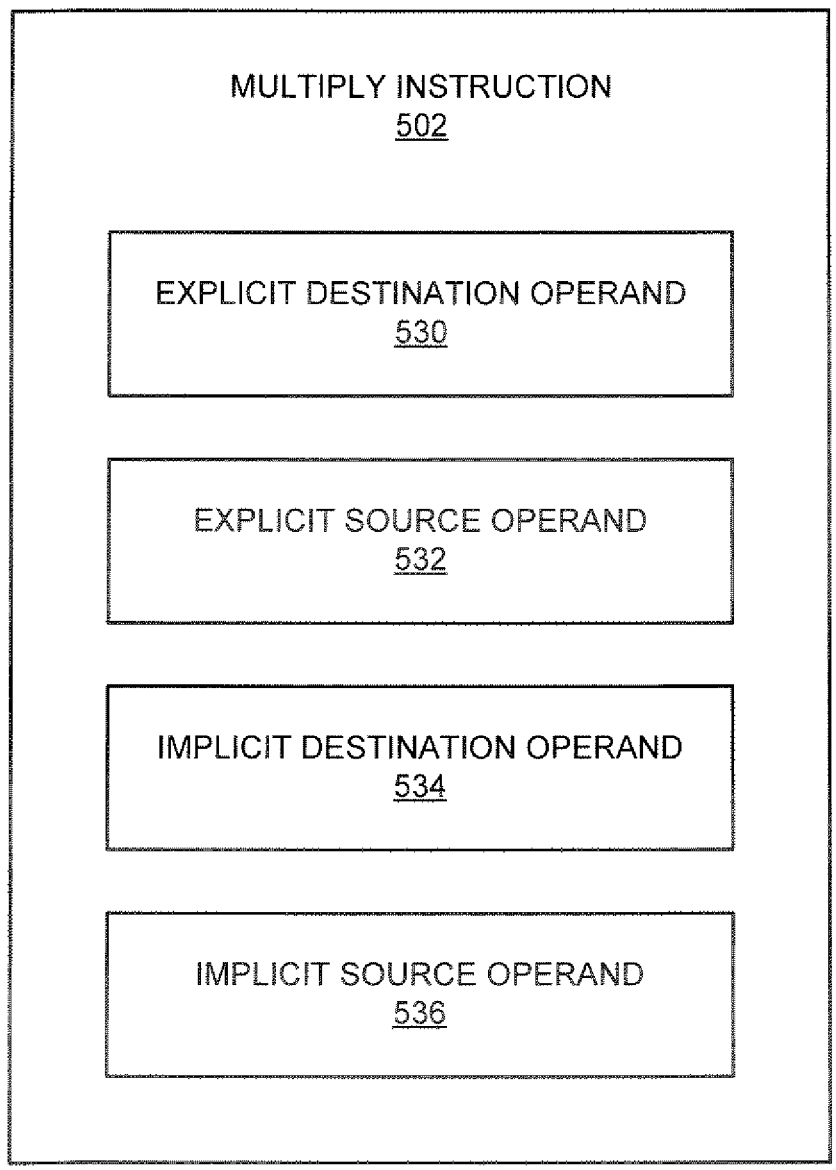
FIG. 5 is a block diagram showing operand specifications for an embodiment of a multiply instruction.

FIG. 5 is a block diagram showing operand specifications for an embodiment of a multiply instruction 502. As shown, the multiply instruction, in accordance with one or more embodiments, may have an explicitly specified destination operand 530 for part of a product/result, an explicitly specified source operand 532, an implicitly specified destination operand 534 for another part of the product/result, and an implicitly specified source operand 536.

The ability to explicitly specify a destination operand 530 may provide the opportunity or ability for the destination operand to be explicitly specified as a different storage location than that used for a source operand 532, 536. In some cases, this may help to avoid the need to include an additional move (e.g., MOV) instruction, or other type of instruction, in order to preserve the result operand beyond execution of the multiply instruction. Alternatively, this may help to avoid the need to restore the source operand after execution of the multiply instruction.

In one or more embodiments, the implicitly specified source operand 536 may be different than the implicitly specified destination operand 534. For example, the implicitly indicated source operand 536 may correspond to a different register than the implicitly indicated destination operand 534. This may help to prevent the implicit source operand 536 from being overwritten with at least that portion of the product which is to be stored in the implicit destination operand 534. Once again, this may help to avoid a move (e.g., MOV) or other instruction and/or help to avoid the need to restore the source operand after execution of the multiply instruction.

Eliminating instructions, such as, for example, move instructions, may help to reduce the number of instructions that need to be decoded/converted, possibly buffered, and executed. Additionally, if a decoded stream buffer (DSB) or the like is to be used, reducing the number of instructions may help to allow a loop of decoded instructions to fit within the DSB, which may further help to increase processing speed by avoiding speed limiting decoding operations. Advantageously, this may help to increase the speed and/or efficiency of large integer multiplication, and certain other algorithms.

In one or more embodiments, the explicitly specified first destination operand may be used to store high order bits of the product, whereas the implicitly specified destination operand may be used to store low order bits of the product. However, this is not required.

The implicit destination operand of an embodiment of a multiply instruction as disclosed herein may be the same as an implicit source operand of the add3 instruction disclosed in U.S. patent application Ser. No. 12/645,334. In some algorithms this may help to avoid a MOV instruction.

Figure 6:
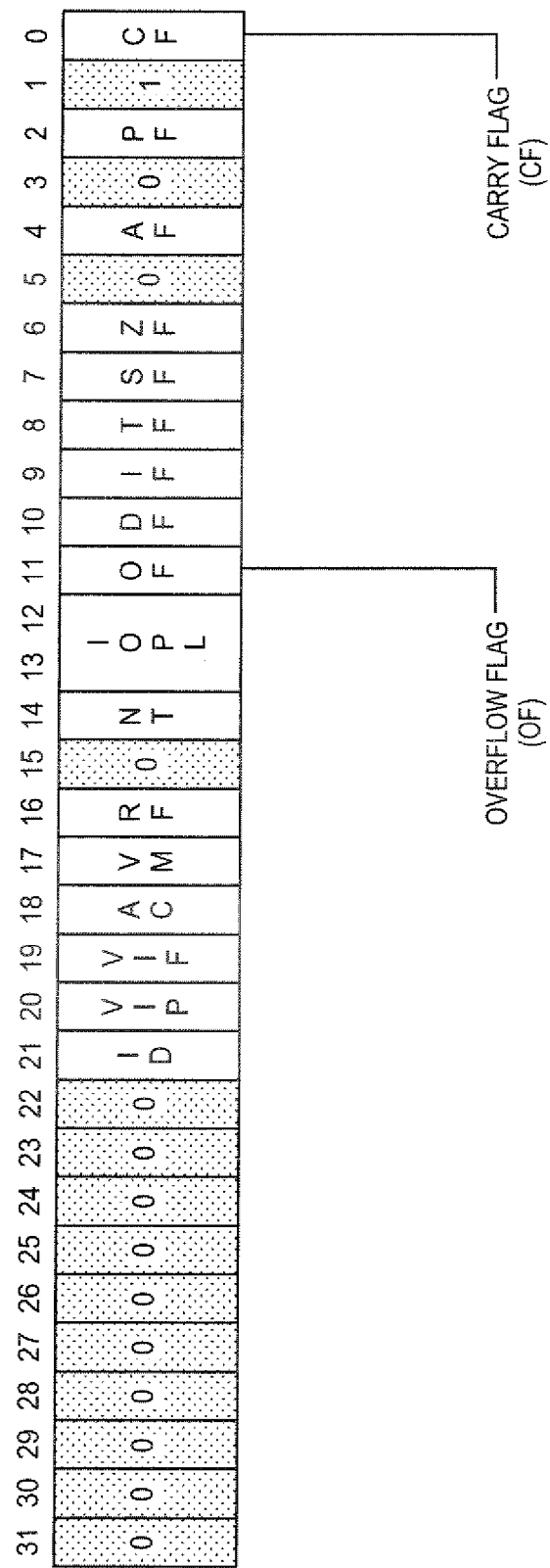
FIG. 6 illustrates an EFLAGS register representing an example embodiment of a register having a carry flag (CF) and overflow flag (OF).

FIG. 6 illustrates an EFLAGS register having a carry flag (CF) and an overflow flag (OF). The EFLAGS register is one particular example embodiment of a register having suitable carry and overflow flags, although this particular register and these particular flags are certainly not required.

The EFLAGS register is a 32-bit register that includes a group of status flags, a control flag, and a group of system flags. The status flags include a carry flag (CF, bit 0), a parity flag (PF, bit 2), an auxiliary carry flag (AF, bit 4), a zero flag (ZF, bit 6), a sign flag (SF, bit 7), and an overflow flag (OF, bit 11).

The system flags include a trap flag (TF, bit 8), an interrupt enable flag (IF, bit 9), an I/O privileged level (IOPL, bits 12-13), a nested task (NT, bit 14), a resume flag (RF, bit 16), a virtual-8086 mode (VM, bit 17), an alignment check (AC, bit 18), a virtual interrupt flag (VIF, bit 19), a virtual interrupt pending (VIP, bit 20), and an ID flag (ID, bit 21). The control flag includes a direction flag (DF, bit 10). Bits 22-31 of EFLAGS are reserved.

The EFLAGS register is the successor to an earlier 16-bit FLAGS register. Additionally, the EFLAGS register, in 64-bit mode processors, has been succeeded and extended to 64-bits by an RFLAGS register. The lower 32-bits of RFLAGS is the same as EFLAGS. In each of the FLAGS, EFLAGS, and RFLAGS registers, the carry flag (CF) is bit 0 and the overflow flag (OF) is bit 11. Additional description of the EFLAGS/RFLAGS registers, and the carry flag, if desired, is available in Intel® 64 and IA-32 Architectures Software Developer's Manual, Volume 1: Basic Architecture, Order Number: 253665-032US, September 2009.

As previously mentioned, execution of the multiply instruction may complete without writing the carry flag. In one or more embodiments, execution of the multiply instruction may complete without reading or accessing the carry flag. In one or more embodiments, execution of the multiply instruction may complete without reading, writing, or accessing an overflow flag. In one or more embodiments, execution of the multiply instruction may complete without reading, writing, affecting a value of, or accessing any arithmetic flags. Alternatively, the execution may read and/or write and/or otherwise access one or more flags besides an overflow flag and/or a carry flag.

In one or more embodiments, the multiply instruction may indicate one or more source operands and/or one or more destination operands in a general-purpose register set. To further illustrate certain concepts, example embodiments of suitable general-purpose registers available in various x86 architecture processors will be discussed, although these particular registers certainly are not required.

Figures 7, 8:
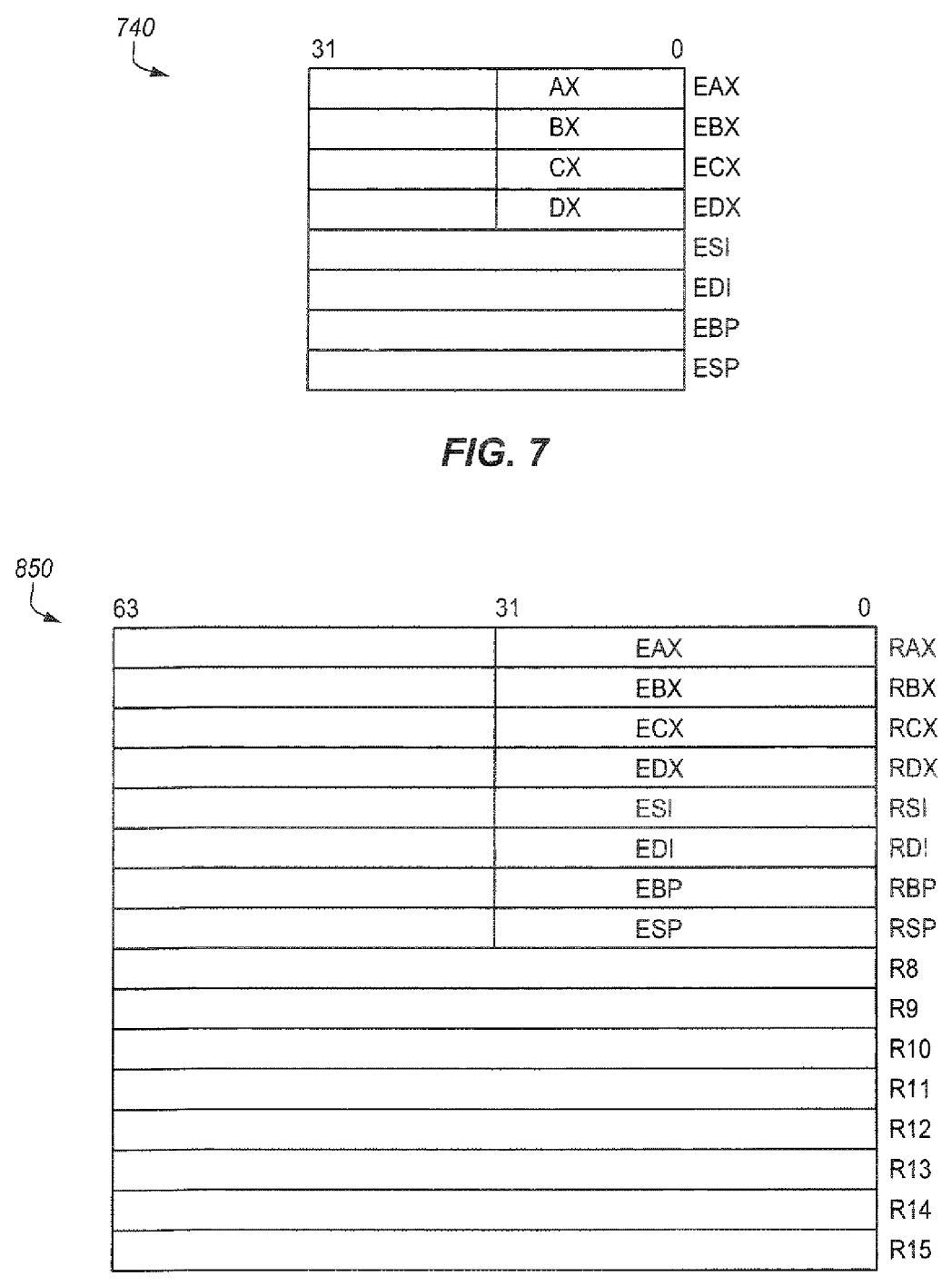

FIG. 7 illustrates one particular example embodiment of a suitable 32-bit general-purpose register set 740. The 32-bit register set includes eight 32-bit or doubleword general-purpose registers. These registers are referred to as EAX, EBX, ECX, EDX, ESI, EDI, EBP, and ESP. These 32-bit registers are also addressable in 16-bit and 8-bit modes. The lower 16 bits of the EAX, EBX, ECX, and EDX registers are referred to as AX, BX, CX, and DX, respectively. By way of example, word unsigned integers having 16-bits may be stored in the registers BX, CX, and DX, respectively. Doubleword unsigned integers having 32-bits may be stored in the registers EAX, EBX, ECX, EDX, ESI, EDI, EBP, ESP, R8D-R15D.

FIG. 8 illustrates another particular example embodiment of a suitable 64-bit general-purpose register set 850. The 64-bit register set includes sixteen 64-bit or quadword general-purpose registers. These registers are referred to as RAX, RBX, RCX, RDX, RSI, RDI, RBP, RSP, R8, R9, R10, R11, R12, R13, R14, and R15. These registers are operable in 32-bit mode on 32-bit operands, and operable in 64-bit mode on 64-bit operands. The lower 32-bits of the RAX, RBX, RCX, RDX, RSI, RDI, RBP, and RSP registers respectively correspond to the EAX, EBX, ECX, EDX, ESI, EDI, EBP, and ESP registers. The lower 32-bits of the registers R8-R15 are also addressable in 32-bit mode and are referred to by R8D-R15D. By way of example, quadword unsigned integers having 64-bits may be stored in the registers RAX, RBX, RCX, RDX, RSI, RDI, RBP, RSP, or R8-R15.

Additional description of the general purpose registers, if desired, is available in Intel® 64 and IA-32 Architectures Software Developer's Manual, Volume 1: Basic Architecture, Order Number: 253665-032US, September 2009. These particular registers are examples only, and are not required.

A multiply instruction, according to one particular example embodiment, is a MULX—Unsigned Multiply Without Affecting Flags instruction. The MULX instruction has the opcode "F2 0F 38F6/r" in 32-bit mode, and the opcode "REX.W+F2 0F 38 F6/r" in 64-bit mode. The MULX instruction is a four-operand instruction, with two of the operands being explicit operands, and the other two operands being implicit operands. The instruction operand encoding for the MULX instruction is shown in Table 1.

TABLE 1

MULX Operand Encoding

| Operand1 | Operand2 | Operand3 | Operand4 |
|---|---|---|---|
| ModRM:reg(W) | ModRM:r/m (R) | RDX/EDX is an implied source operand | RAX/EAX is implied low 64/32 bits of destination |

Operand1 is explicitly specified and may be in the 32-bit general-purpose registers (reg) for the 32-bit mode instruction, or in the 64-bit general-purpose registers for the 64-bit mode instruction. Write (W) is allowed for Operand1.

Operand2 is explicitly specified and may be in the 32-bit general-purpose registers (r), or memory (m), for the 32-bit mode instruction, or in the 64-bit general-purpose registers, or memory, for the 64-bit mode instruction. Read (R) is allowed for Operand2.

Operand3 is implicitly identified as the 32-bit EDX general-purpose register for the 32-bit mode instruction, or as the 64-bit RDX general-purpose register for the 64-bit mode instruction. The Operand3 is used as an implied or implicit source operand.

Operand4 is implicitly identified as the 32-bit EAX general-purpose register for the 32-bit mode instruction, or as the 64-bit RAX general-purpose register for the 64-bit mode instruction. The Operand4 is used as an implied or implicit destination operand for the low order half of the bits.

FIG. 9 shows a description of a MULX instruction representing a particular example embodiment of a multiply instruction. In addition, the default operand size is 32 bits. 16-bit operand size is not encodable. 64-bit operand size has REX.W=1. A prefix byte of 66H before this instruction will cause #UD. Note: If DEST is the same as RAX/EAX, it would contain the high-order bits (high half) of the multiply result.

FIG. 10 shows operation in pseudocode of a MULX instruction representing a particular example embodiment of a multiply instruction. SRC refers to the explicitly specified source operand, DEST refers to a destination operand to store high order bits of the product, and EAX, EDX, RAX, and RDX refer to general-purpose registers.

No flags are affected by MULX. There are no SIMD floating point exceptions for MULX. Further description of opcodes, encoding, REX, and VEX prefixes, if desired, is available in Intel® 64 and IA-32 Architectures Software Developer's Manual Volume 2A: Instruction Set Reference, A-M, Order Number: 253666-032US, September 2009.

The MULX instruction may be implemented in different ways. In one or more embodiments, the MULX instruction may be implemented similarly to the MUL instruction with a few exceptions, in order to reduce changes to the existing architecture. For example, similarly to the MUL instruction, the MULX instruction may be implemented with two micro-operations. One micro-operation may generate the low order half of the product, and the other micro-operation may generate the high order half of the product. The second micro-operation may have a switch such as an enable/disable flag update control bit to specify whether or not the carry flag and the overflow flag are to be updated. In the case of the MULX instruction, the enable flag update control bit may have a first value, such as zero, to indicate that the carry and overflow flags are not to be updated. In the case of MUL, the enable flag update control bit may have a second value, such as one, to indicate that the carry and overflow flags are to be updated dependent upon the value of the product. In addition, the operands of the MUL and MULX instructions may be defined differently, as previously discussed. The front end may be able to decode and store the micro-operations for the MULX instruction. Accordingly in one embodiment a decoder is to generate and an execution unit is to execute a microinstruction or instruction that has a bit or other switch indicating that the carry and overflow flags are not to be updated/changed.

One or more embodiments include an article of manufacture that includes a tangible machine-accessible and/or machine-readable medium having stored thereon a multiply instruction that if executed by a machine (e.g., an execution unit) causes a multiplication operation and completes execution without writing a carry flag. The tangible medium may include one or more solid materials. The medium may include, a mechanism that provides, for example stores, information in a form that is accessible by the machine. For example, the medium may optionally include recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

Suitable machines include, but are not limited to, execution units, general-purpose processors, special-purpose processors (e.g., graphics processors and cryptographic processors), cryptographic accelerators, network communications processors, computer systems, network devices, modems, personal digital assistants (PDAs), cellular phones, and a wide variety of other electronic devices with one or more execution units, to name just a few examples.

Still other embodiments pertain to a computer system, embedded system, or other electronic device having an execution unit and/or performing a method as disclosed herein.

Figure 11:
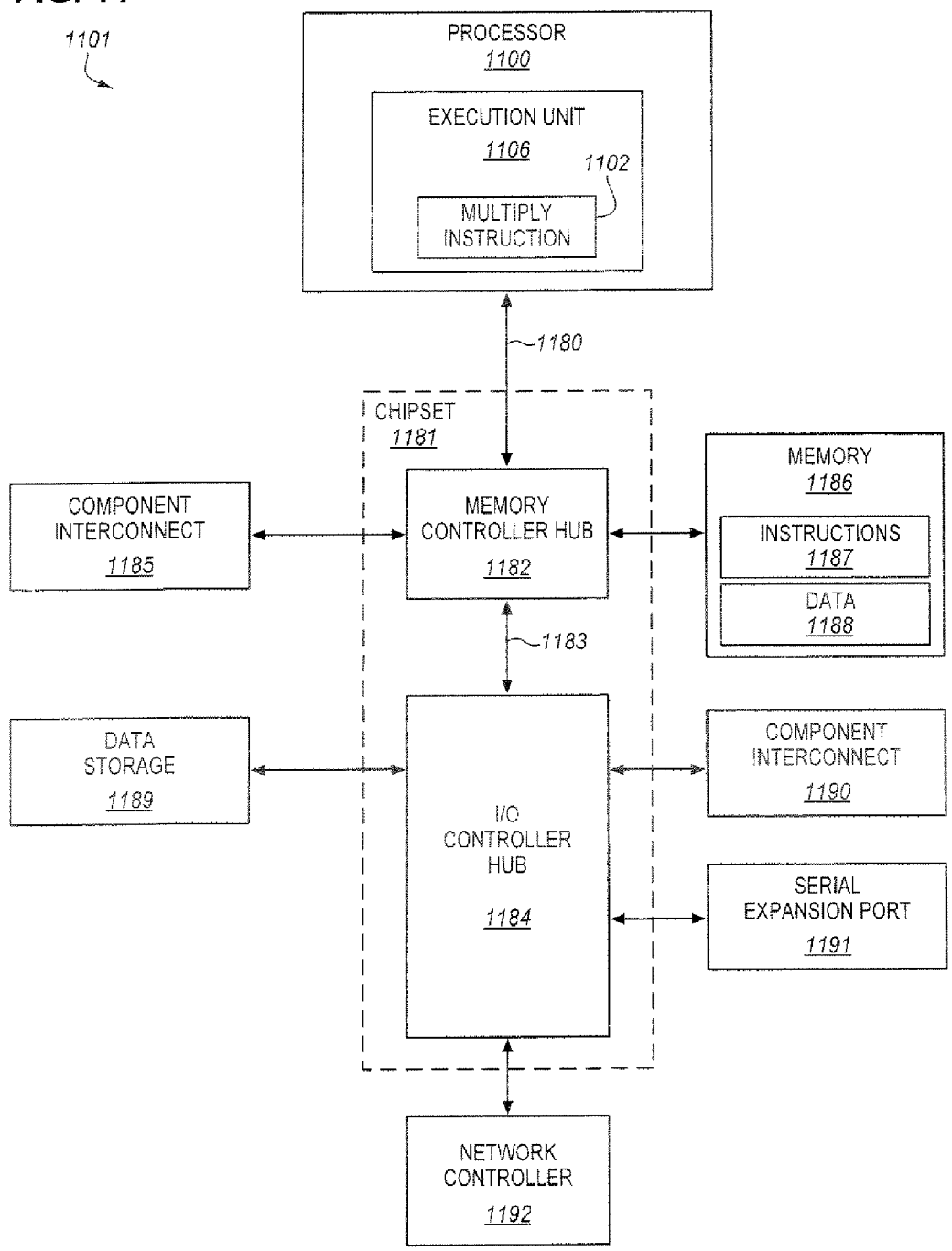
FIG. 11 is a block diagram of a first example embodiment of a suitable computer system.

FIG. 11 is a block diagram of a first example embodiment of a suitable computer system 1101. The computer system includes a processor 1100. The processor includes at least one execution unit 1106 that is capable of executing at least one multiply instruction 1102.

The processor is coupled to a chipset 1181 via a bus (e.g., a front side bus) or other interconnect 1180. The interconnect may be used to transmit data signals between the processor and other components in the system via the chipset.

The chipset includes a system logic chip known as a memory controller hub (MCH) 1182. The MCH is coupled to the front side bus or other interconnect 1180.

A memory 1186 is coupled to the MCH. In various embodiments, the memory may include a random access memory (RAM). DRAM is an example of a type of RAM used in some but not all computer systems. As shown, the memory may be used to store instructions 1187, such as one or more multiply instructions, and data 1188.

A component interconnect 1185 is also coupled with the MCH. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

The chipset also includes an input/output (I/O) controller hub (ICH) 1184. The ICH is coupled to the MCH through hub interface bus or other interconnect 1183. In one or more embodiments, the bus or other interconnect 1183 may include a Direct Media Interface (DMI).

A data storage 1189 is coupled to the ICH. In various embodiments, the data storage may include a hard disk drive, a floppy disk drive, a CD-ROM device, a flash memory device, or the like, or a combination thereof.

A second component interconnect 1190 is also coupled with the ICH. In one or more embodiments, the second component interconnect may include one or more peripheral component interconnect express (PCIe) interfaces. The second component interconnect may allow various types of components to be coupled to the rest of the system through the chipset.

A serial expansion port 1191 is also coupled with the ICH. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the ICH include, but are not limited to, an audio controller, a wireless transceiver, and a user input device (e.g., a keyboard, mouse).

A network controller is also coupled to the ICH. The network controller may allow the system to be coupled with a network.

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. For example, in one or more alternate embodiments, the processor may have multiple cores. As another example, in one or more alternate embodiments, the MCH 1182 may be physically integrated on-die with the processor 1100 and the processor may be directly coupled with a memory 1186 through the integrated MCH. As a further example, in one or more alternate embodiments, other components may be integrated on-die with the processor, such as to provide a system-on-chip (SoC) design. As yet another example, in one or more alternate embodiments, the computer system may have multiple processors.

Figure 12:
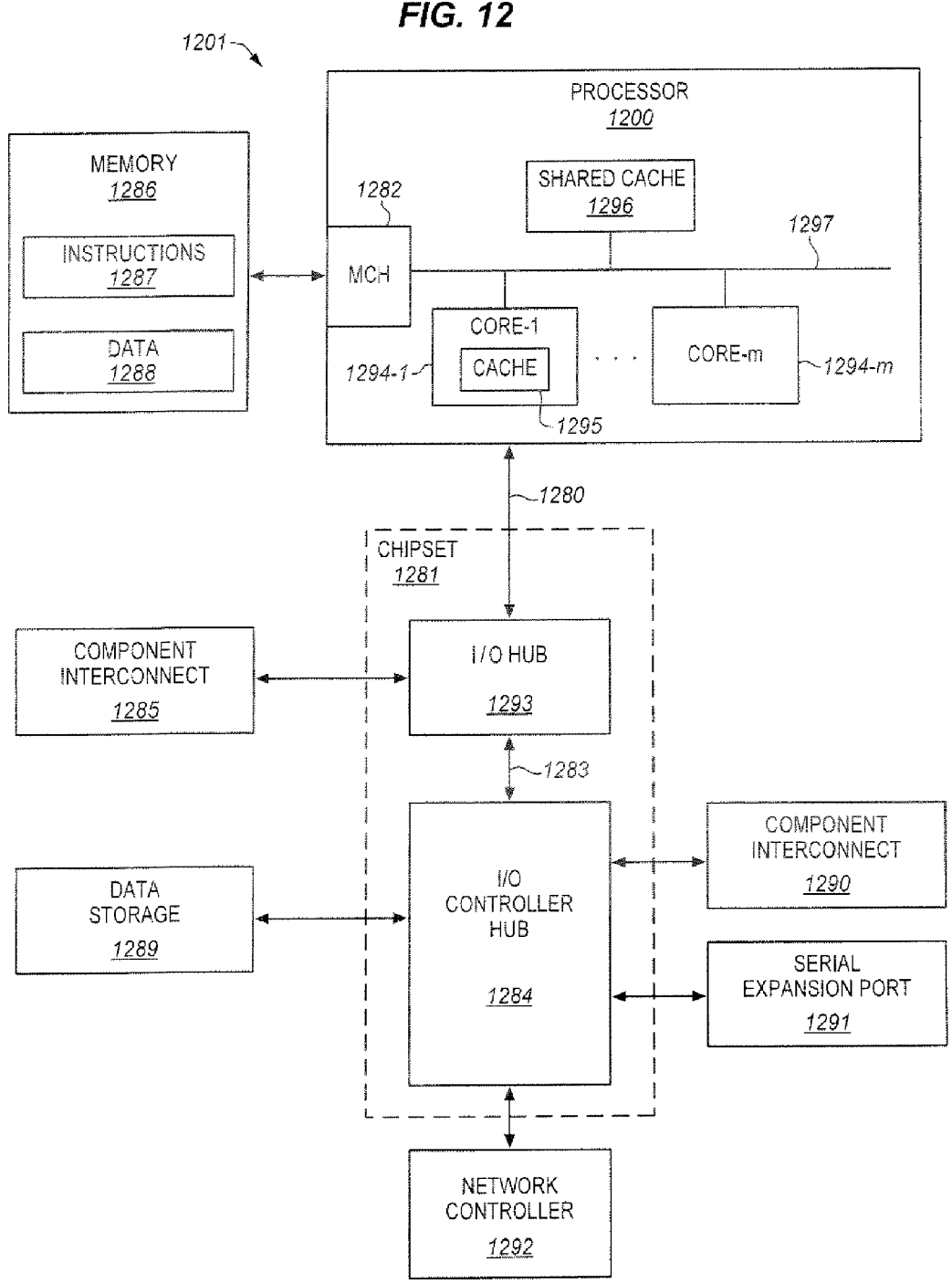
FIG. 12 is a block diagram of a second example embodiment of a suitable computer system.

FIG. 12 is a block diagram of a second example embodiment of a suitable computer system 1201. The second example embodiment has certain similarities to the first example computer system described immediate above. For clarity, the discussion will tend to emphasize the differences without repeating all of the similarities.

Similar to the first example embodiment described above, the computer system includes a processor 1200, and a chipset 1281 having an I/O controller hub (ICH) 1284. Also similarly to the first example embodiment, the computer system includes a first component interconnect 1285 coupled with the chipset, a second component interconnect 1290 coupled with the ICH, a serial expansion port 1291 coupled with the ICH, a network controller 1292 coupled with the ICH, and a data storage 1289 coupled with the ICH.

In this second embodiment, the processor 1200 is a multi-core processor. The multi-core processor includes processor cores 1294-1 through 1294-M, where M may be an integer number equal to or larger than two (e.g. two, four, seven, or more). Each core may include at least one execution unit that is capable of executing at least one embodiment of an instruction as disclosed herein. As shown, the core-1 includes a cache 1295 (e.g., an L1 cache). Each of the other cores may similarly include a dedicated cache. The processor cores may be implemented on a single integrated circuit (IC) chip.

The processor also includes at least one shared cache 1296. The shared cache may store data (e.g., instructions) that are utilized by one or more components of the processor, such as the cores. For example, the shared cache may locally cache data stored in a memory 1286 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

The processor cores and the shared cache are each coupled with a bus or other interconnect 1297. The bus or other interconnect may couple the cores and the shared cache and allow communication.

The processor also includes a memory controller hub (MCH) 1282. As shown in this example embodiment, the MCH is integrated with the processor 1200. For example, the MCH may be on-die with the processor cores. The processor is coupled with the memory 1286 through the MCH. In one or more embodiments, the memory may include DRAM, although this is not required. The memory has instructions 1287 and data 1288.

The chipset includes an input/output (I/O) hub 1293 coupled 1283 with an I/O controller hub 1284. The I/O hub is coupled with the processor through a bus (e.g., a Quick-Path Interconnect (QPI)) or other interconnect 1280. The first component interconnect 1285 is coupled with the I/O hub 1293.

This is just one particular example of a suitable system. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or an execution unit as disclosed herein are generally suitable.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Certain operations may be performed by hardware components, or may be embodied in machine-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to a machine instruction or one or more control signals derived from the machine instruction to store an instruction specified result operand.

It should also be appreciated that reference throughout this specification to "one embodiment", "an embodiment", or "one or more embodiments", for example, means that a particular feature may be included in the practice of embodiments of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
    receiving a multiply instruction, the multiply instruction indicating source operands consisting of only a first source operand and a second source operand, wherein the first and second source operands have a same size;
    performing a multiply operation, including propagating carries, on the first and second source operands to generate a product of the first and second source operands; and
    storing a product of the first and second source operands in one or more destination operands indicated by the multiply instruction, wherein the one or more destination operands in which the product is stored have twice as many bits as each of the first and second source operands; and
    completing execution of the multiply instruction without writing a carry flag,
    wherein the multiply instruction is included in an instruction set with another multiply instruction that when performed is to cause updating of the carry flag dependent upon a corresponding product.

2. The method of claim 1, wherein completing comprises completing execution of the multiply instruction without writing the carry flag regardless of a value of the product.

3. The method of claim 1, wherein completing comprises completing execution of the multiply instruction without reading the carry flag.

4. The method of claim 1, wherein completing comprises completing execution of the multiply instruction without reading or writing an overflow flag.

5. The method of claim 1, wherein receiving comprises receiving the multiply instruction that explicitly specifies a first destination operand of the one or more destination operands and implicitly indicates a second destination operand of the one or more destination operands.

6. The method of claim 1, wherein receiving comprises receiving the multiply instruction that implicitly indicates but does not explicitly specify a source operand selected from the first and second source operands and that implicitly indicates but does not explicitly specify a destination operand of the one or more destination operands, and wherein the implicitly indicated source operand corresponds to a different storage location than the implicitly indicated destination operand.

7. The method of claim 1, further comprising:
    receiving a second multiply instruction indicating a third source operand and a fourth source operand; storing a second product of the third and fourth source operands in one or more second destination operands indicated by the second multiply instruction; and completing execution of the second multiply instruction without writing the carry flag; and
    adding the product and the second product utilizing the carry flag.

8. The method of claim 1, wherein the size of each of the first and second source operands is one of 32 bits and 64 bits, wherein the first source operand comprises a location in a general purpose register, and wherein the product comprises a product of unsigned integers, and wherein the one or more destination operands comprise two destination operands each of a same size as the size of each of the first and second source operands.

9. The method of claim 1, wherein the method is performed by a general-purpose microprocessor having a plurality of cores, and wherein at least one of the cores has circuitry responsive to the instruction and is also operable to execute a second multiply instruction that indicates third and fourth source operands of a same size to generate a second product of the third and fourth source operands indicated by the second multiply instruction and write the carry flag depending on a value of the second product.

10. The method of claim 1, further comprising decoding an ADD instruction, an ADC instruction, and a MOV instruction, and wherein the carry flag is in an EFLAGS register.

11. An apparatus comprising:
    a register to store a carry flag; and
    an execution unit coupled with the register and that is operable as a result of a multiply instruction that is to indicate source operands consisting of only a first source operand and a second source operand that are each to have a same size to multiply the first and second source operands with carry propagation to generate a product and to store the product of the first and second source operands in one or more destination operands that are to be indicated by the multiply instruction, the one or more destination operands to have twice as many bits as each of the first and second source operands, and the execution unit to complete execution of the multiply instruction without writing the carry flag, wherein the multiply instruction is part of an instruction set that also includes another multiply instruction that is to be performed to generate a product and update the carry flag dependent upon a value of the product of said another multiplication instruction.

12. The apparatus of claim 11, wherein the execution unit is to complete execution of the multiply instruction without writing the carry flag regardless of a value of the product.

13. The apparatus of claim 11, wherein the execution unit is to complete execution of the multiply instruction without reading the carry flag.

14. The apparatus of claim 11, wherein the execution unit is to complete execution of the multiply instruction without reading or writing an overflow flag.

15. The apparatus of claim 11, wherein the execution unit is operable to store at least part of the product at a first destination operand of the one or more destination operands that is to be explicitly specified by the multiply instruction and at least part of the product at a second destination operand of the one or more destination operands that is to be implicitly indicated by the multiply instruction.

16. The apparatus of claim 15, wherein the execution unit is operable to store highest order bits of the product at the explicitly specified first destination operand, and wherein the execution unit is operable to store lowest order bits of the product at the implicitly indicated second destination operand.

17. The apparatus of claim 11, wherein the execution unit is operable to receive a source operand that is one of the first and second source operands that is to be implicitly indicated by the multiply instruction, wherein the execution unit is operable to store at least part of the product at a destination operand of the one or more destination operands that is to be implicitly indicated by the multiply instruction, and wherein the implicitly indicated source operand is to correspond to a different storage location than the implicitly indicated destination operand.

18. The apparatus of claim 17, wherein the storage location corresponding to the implicitly indicated source operand comprises a general-purpose register that is one of a 32-bit register and a 64-bit register, and wherein the storage location corresponding to the implicitly indicated destination operand comprises a general-purpose register that is one of a different 32-bit register and a different 64-bit register.

19. The apparatus of claim 11, wherein the product comprises a product of unsigned integers, and further comprising first and second general-purpose registers to respectively store the first and second source operands, wherein the first and second general-purpose registers each have the same size and that size is one of 32-bits and 64-bits.

20. The apparatus of claim 11, wherein the instruction comprises a machine instruction, wherein the execution unit comprises circuitry responsive to the machine instruction, and wherein the execution unit is also responsive to a second multiply instruction that is to indicate third and fourth source operands of a same size to generate a second product of the third and fourth source operands to be indicated by the second multiply instruction and to write the carry flag depending on a value of the second product.

21. The apparatus of claim 11, wherein the execution unit is included within a core of a multi-core general-purpose microprocessor, wherein the first source operand is to be one of a 32-bit operand and a 64-bit operand, and wherein the one or more destination operands comprise two destination operands each of a same size as the first source operand.

22. The apparatus of claim 11, wherein the execution unit is included within a special-purpose cryptographic device, wherein the first source operand is to be one of a 32-bit operand and a 64-bit operand, and wherein the one or more destination operands comprise two destination operands each of a same size as the first source operand.

23. An apparatus comprising:
at least one register to store a carry flag and an overflow flag; and
an execution unit coupled with the at least one register and that is operable as a result of a multiply instruction that is to explicitly specify a first source operand that is to correspond to a first unsigned integer and that is to implicitly indicate but not explicitly specify a second source operand that is to correspond to a second unsigned integer to multiply the first and second unsigned integers with carry propagation to generate a product and to store a high order half of the product of the first and second unsigned integers of the first and second source operands in an explicitly specified first destination operand and to store a low order half of the product in an implicitly indicated but not explicitly specified second destination operand, which is to correspond to a different storage location than the implicitly indicated second source operand, and complete execution of the multiply instruction without writing the carry flag and without writing the overflow flag regardless of a value of the product, wherein the multiply instruction is included in an instruction set with an add instruction that is implicitly to use the storage location, which corresponds to the implicitly indicated but not explicitly specified second destination operand, for a source operand.

24. The apparatus of claim 23, wherein the execution unit is to complete execution of the multiply instruction without reading the carry flag, without writing the carry flag, without reading the overflow flag, and without writing the overflow flag, wherein the implicitly indicated second source operand is to be stored in a general-purpose register that is one of a 32-bit register and a 64-bit register, and wherein the first and second source operands are of a same size.

25. A system comprising:
an interconnect;
a processor coupled with the interconnect, the processor including:
a register to store a carry flag;
an execution unit that is operable as a result of a multiply instruction that is to indicate a first source operand and a second source operand of a same size to multiply the first and second source operands with carry propagation to generate a product and to store the product of the first and second source operands in first and second destination operands to be indicated by the multiply instruction, and to complete execution of the multiply instruction without writing the carry flag, wherein the multiply instruction is to implicitly indicate but not explicitly specify one of the first and second source operands and to implicitly indicate but not explicitly specify one of the first and second destination operands, wherein the implicitly indicated one of the first and second destination operands is to be used to store a least significant portion of the product, and wherein the implicitly indicated source operand is to correspond to a different storage location than the implicitly indicated destination operand; and
a dynamic random access memory (DRAM) coupled with the interconnect, the DRAM storing a large integer multiplication routine that includes the multiply instruction and an add instruction,
wherein an implicitly indicated second destination operand of the multiply instruction is to be a same storage location as an implicit source operand of the add instruction.

26. The system of claim 25, wherein the execution unit is to complete execution of the multiply instruction without writing the carry flag regardless of a value of the product, and wherein each of the first and second source operands has a same size which equals a size of the first destination operand.

27. An article of manufacture comprising:
a machine-readable storage medium storing a first multiply instruction and a second multiply instruction, the machine-readable storage medium including at least one of a floppy diskette, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory,
the first multiply instruction to indicate as source operands only a first source operand and a second source operand and when executed by a machine is operable to cause the machine to perform operations comprising:
performing a multiply operation on the first and second source operands to generate a product of the first and second source operands;
storing the product of the first and second source operands in one or more destination operands that are to be indicated by the first multiply instruction; and
completing execution of the first multiply instruction without writing a carry flag regardless of a value of the product; and
the second multiply instruction to indicate a third source operand and a fourth source operand and when executed by the machine is operable to cause the machine to perform operations comprising:
performing a multiply operation, of a same type as the multiply operation of the first multiply instruction, on the third and fourth source operands to generate a second product of the third and fourth source operands;
storing the second product of the third and fourth source operands in one or more destination operands indicated by the second multiply instruction; and
writing the carry flag depending on a value of the second product,
wherein the first multiply instruction has a same number of source operands, and a same size of source operands, as the second multiply instruction.

28. The article of claim 27, wherein the first multiply instruction is to implicitly indicate a destination operand and is to implicitly indicate a source operand, and wherein the implicitly indicated destination operand of the first multiply instruction is to correspond to a different storage location than the implicitly indicated source operand of the first multiply instruction.

29. The article of claim 27, wherein the first multiply instruction is to indicate source operands consisting of the first and second source operands, wherein the first and second source operands are of a same size and the one or more destination operands to be indicated by the first multiply instruction include two destination operands each of a same size as each of the first source operand and the second source operand.

30. An apparatus comprising:
an execution unit that is operable as a result of a first multiply instruction that is to indicate as source operands only a first source operand and a second source operand to perform a multiply operation on the first and second source operands to generate a first product and to store the first product of the first and second source operands in one or more destination operands to be indicated by the first multiply instruction, and to complete execution of the first multiply instruction without writing a carry flag regardless of a value of the first product, and
wherein the execution unit is operable as a result of a second multiply instruction that is to indicate a third source operand and a fourth source operand to perform a multiply operation, of a same type as the multiply operation of the first multiply instruction, on the third and fourth source operands to generate a second product and to store the second product of the third and fourth source operands in one or more destination operands to be indicated by the second multiply instruction, and to write the carry flag depending on a value of the second product, wherein the first and second multiply instructions are each to indicate a same number of source operands, and wherein each of the source operands to be indicated by the first and second multiply instructions is to have a same size.

31. An apparatus comprising:
a register to store a carry flag; and
a decoder to decode a multiply instruction and an add instruction, the multiply instruction to indicate a first source operand and a second source operand; and
an execution unit coupled with the decoder and the register and that is operable as a result of the multiply instruction to:
multiply the first and second source operands with carry propagation to generate a product; and
store a highest order part of the product of the first and second source operands in a first destination operand that is to be explicitly specified by the multiply instruction;
store a lowest order part of the product in a second destination operand that is to be implicitly indicated by the multiply instruction; and
complete execution of the multiply instruction without writing the carry flag regardless of a value of the product,
wherein the implicitly indicated second destination operand is to be a same storage location as an implicit source operand of the add instruction.

32. The apparatus of claim 31, wherein the implicitly indicated second destination operand is to be different than an implicitly indicated source operand of the multiply instruction.

* * * * *